United States Patent [19]

Kornas et al.

[11] 3,839,947

[45] Oct. 8, 1974

[54] APPARATUS FOR TUCKING AND ROLLING A VEHICLE OCCUPANT AIR BAG

[75] Inventors: Zigmunt C. Kornas, Detroit; Marino V. Putti, Warren; Ronald E. Susick, Dryden; Daniel F. Tardiff, Richmond, all of Mich.

[73] Assignee: General Motors Corporation, Detroit, Mich.

[22] Filed: Aug. 31, 1973

[21] Appl. No.: 393,426

[52] U.S. Cl.................. 93/32, 93/8 R, 93/84 R, 93/84 TW
[51] Int. Cl............................................ B31b 1/52
[58] Field of Search .......... 93/32, 84 TW, 84 R, 31, 93/8 R

[56] References Cited
UNITED STATES PATENTS

| 105,099 | 7/1870 | Lorton et al. .......................... 93/8 R |
| 234,544 | 11/1880 | Davidson ............................. 93/8 R |
| 1,381,419 | 6/1921 | Hyams et al. ......................... 93/8 R |
| 1,434,934 | 11/1922 | Van Sant ........................ 93/8 R X |
| 1,518,192 | 12/1924 | Gangler .................................. 93/32 |

FOREIGN PATENTS OR APPLICATIONS

| 2,000,570 | 9/1970 | Germany ........................ 93/84 TW |

*Primary Examiner*—Roy Lake
*Assistant Examiner*—James F. Coan
*Attorney, Agent, or Firm*—J. A. Kushman

[57] ABSTRACT

An apparatus for tucking and rolling a vehicle occupant air bag for both center and outboard passengers of a vehicle front seat so that the bag assumes a stored condition. The apparatus includes a framework for mounting an elongated diffuser that is inserted into the bag before the tucking and rolling operation. A number of movable end tucking arms are mounted on the framework and clamped to the ends of the bag while in retracted positions so that the bag assumes an outstretched configuration with main bag portions extending past the ends of the diffuser. A movable side tucking arm is also mounted on the framework and is positioned in a retracted position so as to be adjacent the lower side of the bag at the end of the bag that is outboard when mounted in the vehicle. Two pairs of pincher arms pinch the main bag portions and expand the bag so that the end tucking arms may be moved to extended positions where the ends of the bag are tucked between the main bag portions so that the bag is generally located between the opposite ends of the diffuser. The side tucking arm is also moved to an extended position to tuck the outboard portion of the bag between the main bag portions at the inboard end of the diffuser. After the tucking operation, the pincher arms move the bag to a flattened condition so that the end tucking arms may be unclamped from the bag and moved back to the retracted positions along with the side tucking arm in a manner that leaves the bag in a somewhat triangular configuration. A rolling assembly of the apparatus is swung to a use position to allow a bifurcated clamp of an elongated configuration to be clamped to the lower side of the bag in a spaced and parallel relationship with respect to the diffuser. The clamp is rotatably supported by a pair of slidable carriers that are pulled toward the diffuser as the clamp is rotated to roll the bag thereabout and a tucked roll is thus formed alongside the diffuser upon completion of the rolling. A pawl and ratchet arrangement prevents reverse rotation of the clamp prior to completion of the rolling and upon such completion the clamp is axially pulled from the carriers to unclamp the bag.

5 Claims, 15 Drawing Figures

APPARATUS FOR TUCKING AND ROLLING A VEHICLE OCCUPANT AIR BAG

BACKGROUND OF THE INVENTION

This invention relates generally to an apparatus for storing a vehicle occupant air bag in a stored condition awaiting use.

Vehicle occupant air bags for restraining a vehicle occupant during a vehicle impact condition have heretofore been known. Generally, these bags are inflated by a diffuser which receives pressurized gas during a vehicle impact and distributes this gas to inflate the bag in a manner that restrains a seated occupant in position during the impact condition. The front seat center and outboard passengers can generally be restrained by the same bag when the diffuser is mounted on the vehicle generally in the area that heretofore has been occupied by the vehicle glove box. The diffuser has an elongated configuration and, in this mounted position, extends generally transversely with respect to the vehicle and thus causes the bag to move somewhat in an inboard direction upon inflation to restrain the center passenger. Also, the outboard end of the diffuser is generally located somewhat inwardly of the outboardmost vehicle interior confine adjacent this outboard front seat passenger so that it is necessary for the outboard end of the bag to extend past the outboard end of the diffuser in the inflated bag condition to provide a full frontal restraint. Nevertheless, the bag ends must be located between the ends of the diffuser while located in a stored condition awaiting inflation. This is necessary to minimize the space necessary to mount the diffuser and bag within the vehicle.

SUMMARY OF THE INVENTION

This invention provides an apparatus for tucking the ends of a vehicle occupant air bag between main bag portions and then rolling the tucked bag into an elongated roll extending alongside an elongated diffuser received within the bag so that the bag is thus stored in a tucked roll within the confines of the ends of the diffuser.

One feature of the apparatus is that it first expands the bag so that the main bag portions are positioned in spaced relationship with respect to each other in a manner that allows end tucking arms at the ends of the bag to be moved from retracted positions to extended positions to provide the tucking of the bag ends, and an elongated clamp is then clamped to the free end of the bag away from the diffuser and rotated to roll the bag thereabout and form a tucked roll alongside the diffuser. Another feature of the apparatus is that it includes a side tucking arm movable from a retracted position to an extended position to engage the free side of the expanded bag adjacent the outboard end thereof so as to tuck the outboard portion of the bag adjacent the inboard end of the diffuser in a manner that forms the bag into a somewhat triangular configuration with a vertex to which the clamp is secured to perform the rolling operation. Another feature of the apparatus is that the end tucking arms include clamps for selectively clamping the edges of the bag ends to facilitate the tucking operation. Another feature of the apparatus is that it includes pincher arms which pinch the main bag portions and move these bag portions to their spaced relationship that allows the tucking of the bag ends therebetween. Another feature of the apparatus is that the elongated clamp for rolling the bag is inserted through aligned bearings on a pair of slidable carriers so as to thereby be supported for rotational movement, and the carriers are pulled toward the diffuser as the clamp rotation rolls the bag into the tucked roll adjacent the diffuser. Another feature of the apparatus is that this elongated clamp has a bifurcated configuration and clamps the bag between the tines of the clamp so that the clamp may be axially pulled and unclamped from the bag after the rolling operation has been completed. Another feature of the apparatus is that a pawl and ratchet arrangement prevents reverse rotation of the clamp during the rolling operation.

BRIEF DESCRIPTION OF THE DRAWINGS

The above-specified features and other features, objects and advantages of the present invention are readily apparent from the following detailed description of the preferred embodiment and the drawings in which.

DETAILED DESCRIPTION OF THE PREFERRED EMBODIMENT

Figure 1:
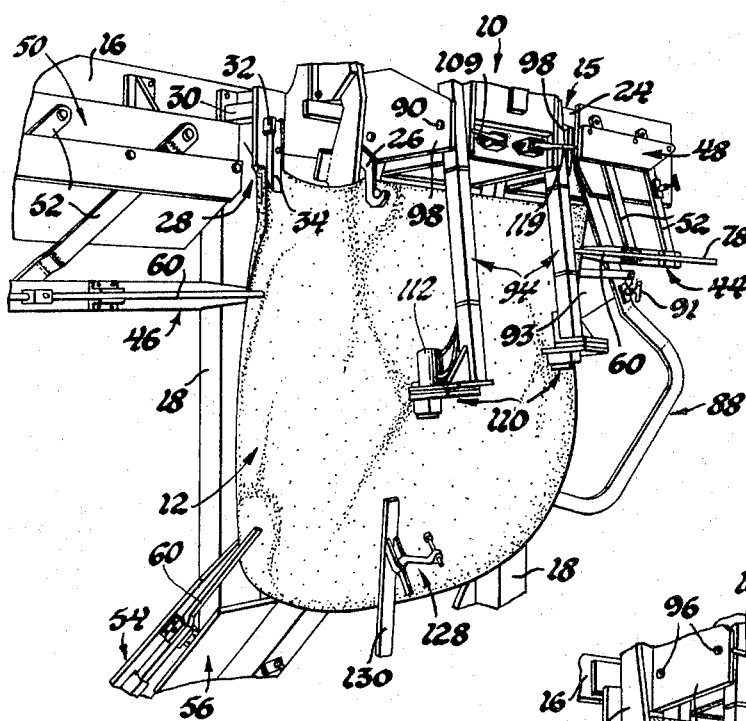
FIG. 1 is a perspective view of the tucking and rolling apparatus according to this invention with the vehicle occupant air bag shown in its expanded condition where main bag portions are spaced to allow the ends of the bag to be tucked between these bag portions.
Figure 2:
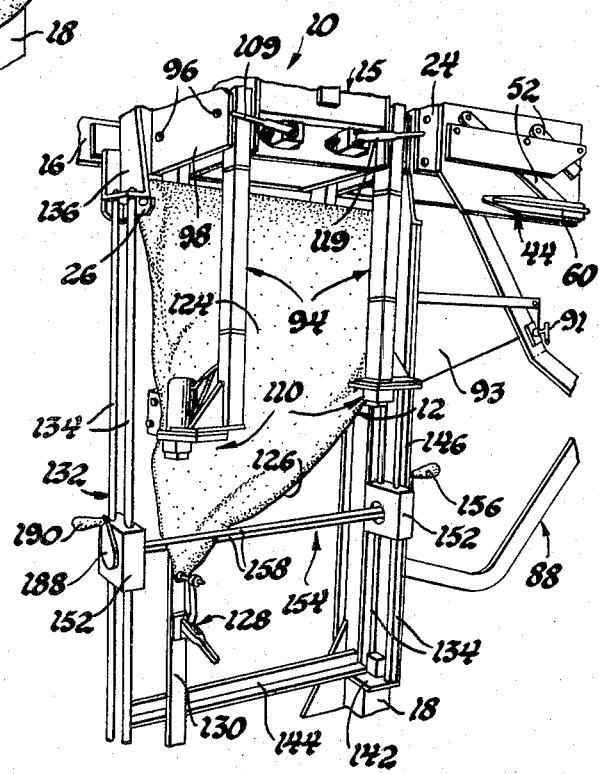
FIG. 2 is a perspective view similar to FIG. 1 showing the bag after the tucking operation and in a condition ready to begin the rolling operation.
Figure 3:
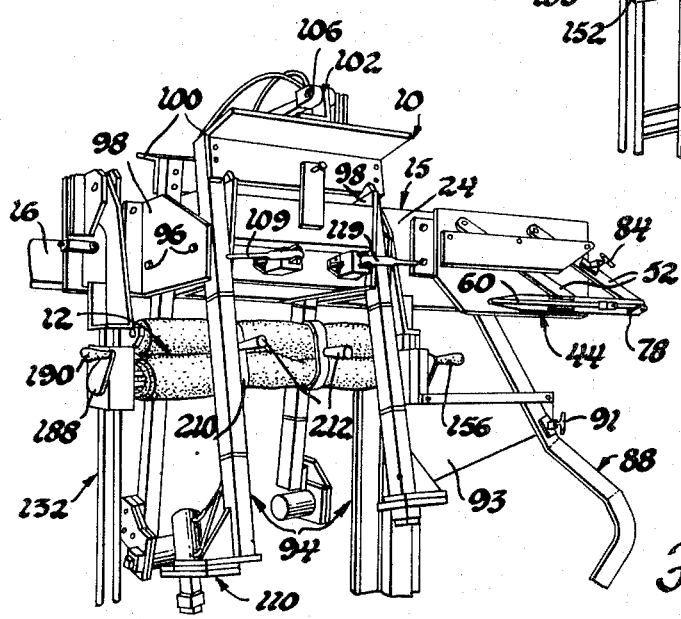
FIG. 3 is a view similar to FIG. 2 which shows the air bag after the rolling operation has been completed.

Referring to the drawings and particularly to FIG. 1, an apparatus for tucking and rolling a vehicle occupant air bag is indicated generally at 10 and is shown with such a bag 12 prior to the tucking and rolling operations. Without referring to the specific components of the apparatus as yet, a general reference to FIG. 2 shows the bag after the apparatus has performed the tucking operation but before the rolling operation has commenced. FIG. 3 shows a further stage where the bag has been rolled into a stored condition and is ready for removal from the apparatus and for installation within a vehicle.

This bag 12 is of the type which is used to restrain the upper torso portions of center and outboard vehicle front seat passengers. It is particularly adapted for use with an inner bag received generally inside the confines of this bag so that the inner bag restrains the lower knee portions of the same occupants. Both of these bags are inflated by a common diffuser which receives pressurized gas from a suitable source. This diffuser has a generally elongated configuration and is shown generally by phantom line representation in FIG. 4 with the numeral indication 14. The inner bag is secured to the diffuser 14 and rolled to a stored condition by an apparatus which is shown and described in copending application Ser. No. 393,427, filed Aug. 31, 1973. The diffuser and stored inner bag are then inserted through a suitable slit into the internal confines of bag 12 ready for tucking and rolling of the bag to a stored condition prior to installation in a vehicle. The tucking and rolling operations performed by this apparatus 10 do not necessarily, however, have to be performed with such a double bag type unit, but may be used with only a single bag type unit.

Figure 4:
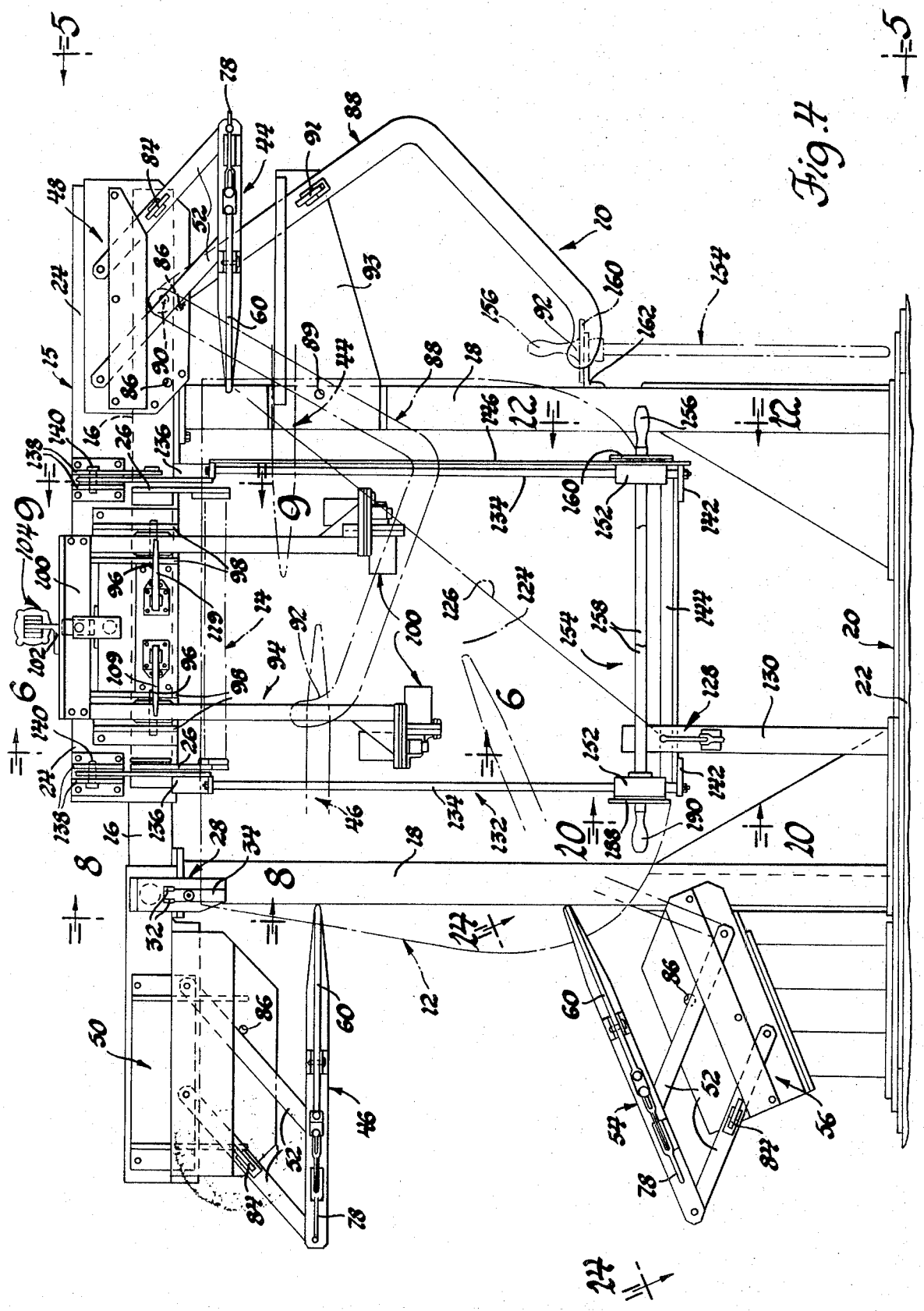
FIG. 4 is a side view of the apparatus showing tucking arms located in solid line indicated retracted positions where the bag is allowed to assume its expanded condition and in phantom line indicated extended positions where the ends of the bag and the outboard portion of the free side thereof are tucked between the main bag portions.
Figure 9:
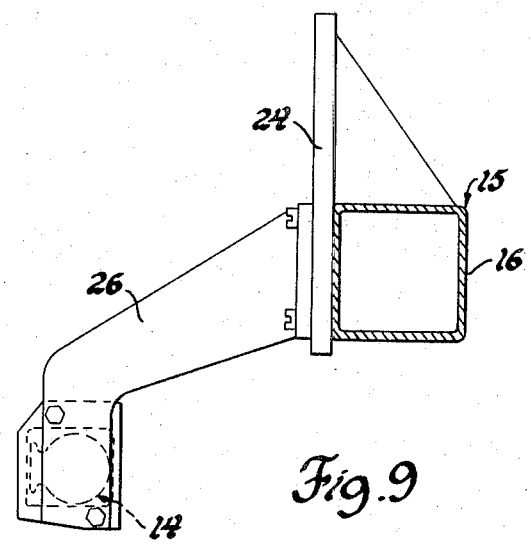
FIG. 9 is a view taken generally along line 9—9 of FIG. 4 and shows the relative positioning of the diffuser that is inserted within the bag prior to the tucking and rolling operation with respect to an upper beam of the framework of the apparatus.

Referring to FIG. 4 of the drawings, the tucking and rolling apparatus 10 includes a framework that is generally indicated by 15. This framework includes a horizontal upper beam 16 that extends between the opposite ends of apparatus 10. A pair of vertical legs 18 have upper ends that support beam 16 and have lower legs which are supported by a base 20 that is mounted on the floor 22. The beam 16, the legs 18, and the base 20 thus provide a rectangular framework of a sturdy construction. On the right hand two-thirds or so of framework beam 16, a mounting plate 24 is suitably secured to this beam and has a generally rectangular configuration. The mounting plate 24 supports a pair of spaced diffuser brackets 26, one of which can be seen also in FIG. 1 and the other of which can be seen in FIG. 9. These brackets detachably mount the diffuser 14 with respect to the apparatus framework 15 so that the bag 12 will hang downwardly from the diffuser generally in the manner shown by FIG. 1. One way in which these brackets may support the diffuser is to have suitable apertures in the bag at each end of the diffuser which receive bolts on the diffuser ends so that these bolts may be received by the hook-shaped configurations of the brackets shown in FIGS. 1 and 9. These bolts may also be used to mount the diffuser when it is installed within a vehicle.

Figure 8:
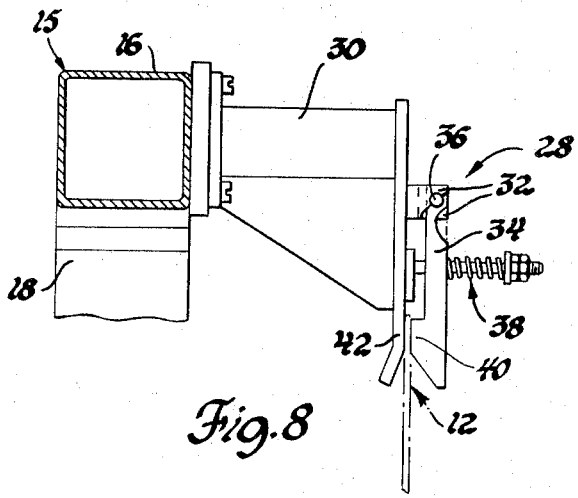
FIG. 8 is a view taken along line 8—8 of FIG. 4 and shows the details of a clamp that clamps the inboard end of the bag in its upper position as shown in FIG. 1.

The upper left-hand corner of the bag 12 as mounted in FIG. 4 corresponds with the inboard end of the bag when it is installed within a vehicle, and this portion of the bag is secured in position by a clamp indicated generally at 28. Additional reference to FIG. 8 shows that this clamp is mounted on beam 16 generally adjacent the upper end of one of the vertical legs 18 by way of a bracket 30. This bracket carries a pair of spaced flanges 32 that receive the upper end of a clamping member 34 that is pivotally secured by a pin 36 extending between the flanges. A spring and bolt arrangement 38 normally biases the clamping member 34 clockwise about pin 36 so that a lower clamping portion 40 of the clamping member is cooperable with a clamping portion 42 of bracket 30 to selectively secure the corner of the bag 12 in position.

A pair of end tucking arms 44 and 46 are located at the right and left-hand ends of the beam 16 and selectively clamped to the right and left-hand ends of the bag 12 generally where their noses engage the phantom line indication of the bag in FIG. 4. In this clamped position, the right-hand or outboard end of the bag extends past the outboard end of the diffuser 14 slightly less than the left-hand or inboard end of the bag extends past the inboard end of the diffuser. These tucking arms 44 and 46 are respectively mounted on bracket arrangements 48 and 50 on the beam 16 by way of four bar linkages. These linkages include links 52 secured to the brackets 48 and 50 and to the tucking arms 44 and 46 so that swinging movement of the links moves the tucking arms between the solid line indicated retracted positions shown by FIG. 4 and the phantom line indicated extended positions where the noses of the tucking arms are positioned generally adjacent each other. A third end tucking arm 54 is also clamped to the bag at a somewhat later stage, as will be hereinafter described, and is similar to the tucking arms 44 and 46. A bracket arrangement 56 is mounted on the base 20 of the apparatus adjacent the lower left-hand edge of the bag and supports this tucking arm 54 by way of a pair of links 52 in a four bar linkage. Tucking arm 54 is thus mounted like tucking arms 44 and 46 for movement between retracted and extended positions respectively shown by solid and phantom line representation in FIG. 4.

Figure 14:
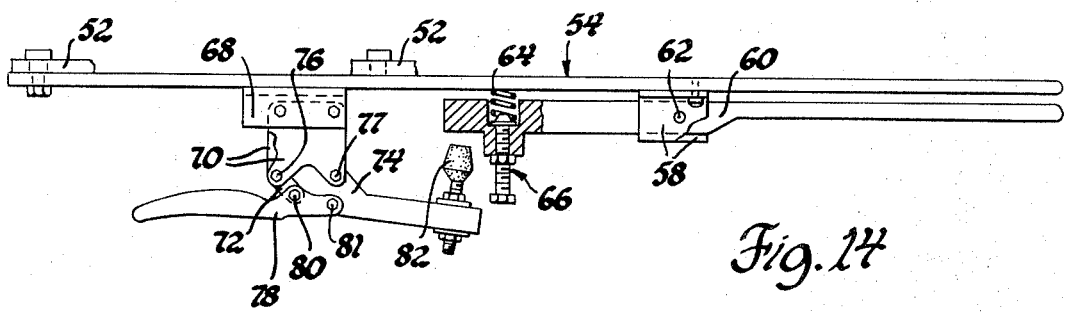
FIG. 14 is illustrative of the clamps that the end tucking arms carry in order to clamp to the edges of the bag in the position shown in FIG. 1.

Reference to FIG. 14 shows the details of tucking arm 54 and the manner in which this arm is capable of being clamped to the bag 12. The other two end tucking arms 44 and 46 include identical components and the description is thus applicable to them as well. As can be seen in this figure, the tucking arm includes a pair of spaced flanges 58 that receive the intermediate portion of an elongated clamping member 60. A pin 62 pivots this clamping member between the flanges so that a helical spring at the left-hand end of the clamping member biases it in a counterclockwise direction about the pin. This bias causes the right-hand end of the clamping member 60 to normally engage the right-hand end of tucking arm 54 to thus clamp the bag. An adjustable bolt arrangement 66 controls the degree to which the spring 64 biases the clamping member 60 and thus the clamping force that is exerted.

As also seen in FIG. 14, to the left of clamping member 60, a flange 68 is suitably mounted on the tucking arm 54 and carries a pair of spaced plates 70 between which are received one end of a link 72 and a portion of a release member 74 that are respectively pivoted thereto by pins 76 and 77. A handle 78 is secured to the other end of link 72 by a pin 80 and to another portion of release member 74 by a pin 81. The release member 74 carries a suitable rubber stop 82 that engages the left-hand end of clamping member 60 when the handle 78 is pulled downwardly and to the right. This stop then acts against the bias of spring 64 to move the clamping member 60 clockwise about pin 62 to an unclamped position that releases the bag from the clamping engagement. The pin 80 moves overcenter of a line through pin 76 and pin 81 to provide an overcenter action that will hold the clamping member 60 in the unclamped position. An opposite manual force of handle 78 will move the release member 74 to the position shown by FIG. 14 to release the clamping member 60 and allow its normal spring bias to locate the clamping member in its clamping position.

Reference again to FIG. 4 shows that each of the end tucking arms 44, 46 and 54 has one of its links 52 provided with a suitable detent 84. The bracket arrangements 48, 50 and 56 define apertures 86 that selectively receive these detents 84 in order to locate the tucking arms 44, 46 and 54 in either the retracted positions indicated by solid line representation or the extended positions indicated by phantom line representation. Thus, the tucking arms are readily positioned in these positions during the tucking and rolling operation provided by this apparatus. The details of these detents are not shown and described as they may assume any of a number of conventional embodiments.

The apparatus 10 also includes a side tucking arm 88 that has a generally L-shaped configuration. The upper end of this side tucking arm is pivotally secured to bracket arrangement 48 by a pin 90 and the lower end 92 thereof is positioned adjacent the lower side of bag 12 at its FIG. 4 right-hand end which corresponds with the outboard end of the bag when it is located within a vehicle. This arm is movable betwen the solid line indicated retracted position and the phantom line indicated extended position upon selective actuation of a detent 91 that cooperates with apertures 89 in a plate 93 of the apparatus framework in a manner similar to the detents 84 on tucking arms 44, 46 and 54.

Figures 5, 6:
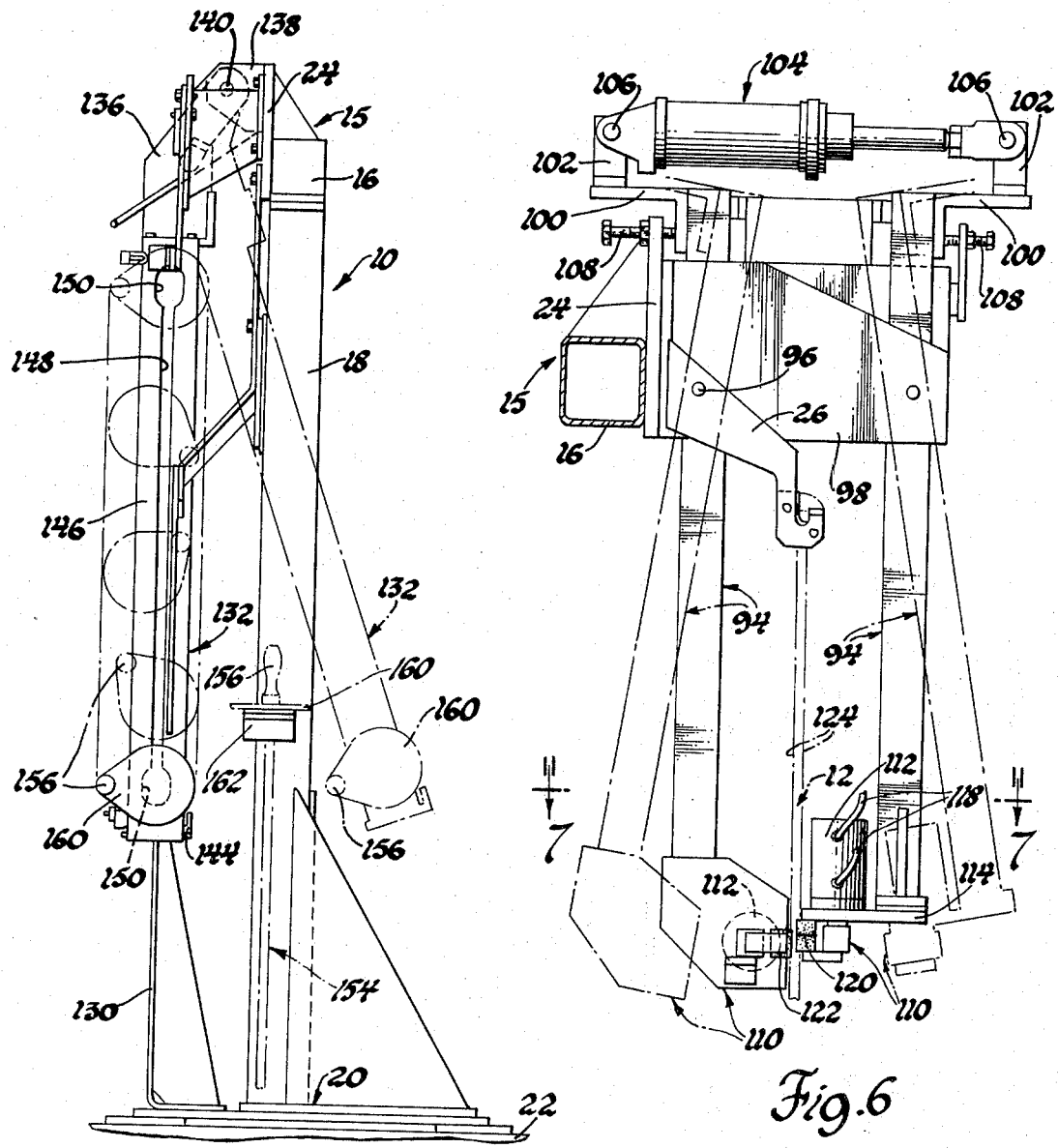
FIG. 5 is an end view of the apparatus taken generally along line 5—5 of FIG. 4 and shows a rolling assembly that is swung from the phantom line indicated position to the solid line indicated position to allow the elongated clamp seen in FIG. 2 to be clamped to the lower side of the bag so that rotation of this clamp rolls the bag and moves the clamp upwardly toward the diffuser which is received within the bag adjacent the upper side thereof.
FIG. 6 is an enlarged view of a portion of the apparatus taken generally along line 6—6 of FIG. 4 and shows pincher arms that are moved to the solid line indicated positions to pinch the main bag portions and to the phantom line indicated positions to move the pinched main bag portions into the spaced relationship that allows the tucking operation.

As generally shown by FIG. 4, the apparatus 10 includes pincher arms 94. There are four such pincher arms, two longer ones and two shorter ones. Additional reference to FIG. 6 illustrates the two longer ones which are similar to the two shorter ones except for their length. As can be seen by reference to these two figures, the pincher arms are located on the apparatus on each side of bag 12 and are pivotally supported by pins 96 extending between spaced brackets 98 that are suitably supported on the mounting plate 24 carried by the framework beam 16. The upper ends of the pincher arms 94 are suitably secured to a pair of coordinating members 100 that have L-shaped cross-sections as shown by FIG. 6. These coordinating members extend between the longer and shorter pincher arms 94 as seen in FIG. 4 to thus coordinate movements of the pincher arms. The coordinating members carry flanges 102, as seen in FIG. 6, which are secured to the opposite ends of a piston and cylinder arrangement 104 by pins 106. This piston and cylinder arrangement is selectively supplied a differential fluid pressure so as to be extended and to thereby position the pincher arms 94 in the solid line indicated inner positions shown in FIG. 6, and is selectively fed a reverse differential fluid pressure so as to be retracted and to position the pincher arms in the phantom line indicated outer positions as shown by this same figure. A pair of adjustable stops 108 determine the position of the pincher arms in their inner positions, and a valve 109 controls the differential fluid pressure supplied to the piston and cylinder arrangement. This valve 109 is mounted on the apparatus framework between the upper ends of the pincher arms 94 as can be seen in FIGS. 1 through 4.

Figure 7:
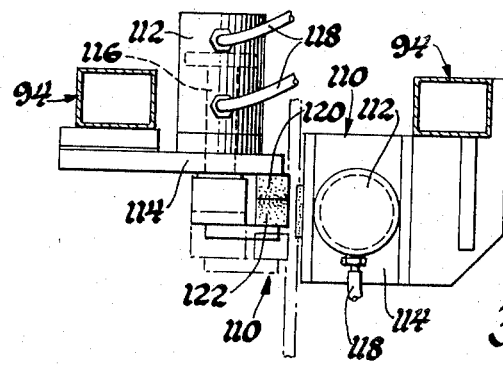
FIG. 7 is a view taken generally along line 7—7 of FIG. 6 and shows pinchers that are mounted on the lower ends of the pincher arms.

The lower ends of pincher arms 94 carry pinchers indicated generally by 110. As seen in FIG. 7, each pincher 110 includes a cylinder 112 secured to a plate 114. One of the plates is oriented horizontally while the other is oriented vertically so that pistons 116 received by the cylinders are movable in a perpendicular relationship with respect to each other upon being supplied with a differential fluid pressure by way of fluid lines 118. A valve 119, see FIGS. 1 through 4 momentarily, is mounted on the apparatus framework adjacent valve 109 and controls the supply of this differential fluid pressure. Reference back to FIGS. 6 and 7 shows that each plate 114 at the lower end of the associated arm 94 carries a fixed pincher element 120 of a suitable friction type material. The end of each piston 116 extending through the associated plate 114 also carries a movable pincher element 122 of a similar material. The pistons 116 carry these movable pincher elements 122 into engagement with the fixed pincher elements 120 upon movement to their retracted positions as shown by the pincher 110 whose side view is seen in FIG. 7. With the pincher arms located in their inner positions shown in FIG. 6, each pincher 110 engages a main bag portion 124 of bag 12 and each fixed pincher element 120 has a portion in alignment with the fixed pincher element of the other pincher. Movement of the pistons 116 from their extended positions to their retracted positions then moves the movable pincher elements 122 toward their associated fixed pincher elements 120 and pinches the main bag portions 124 between these elements. Due to the perpendicular orientation of the pinchers with respect to each other and the alignment of portions of the fixed pincher elements 120, each pincher 110 will then pinch only one of the main bag portions 124 and subsequent movement of the pincher arms 94 to their outer phantom line indicated positions, as shown in FIG. 6, expands the bag 12 to the tent-like configuration shown in FIG. 1 where the main bag portions are maintained in a spaced relationship.

At this stage of the tucking operation, the end tucking arm 44 is moved to its extended position shown by phantom representation in FIG. 4 to tuck the outboard end of bag 12 between the main bag portions 124 and the side tucking arm 88 is likewise moved to its phantom line represented extended position to tuck the outboard end of the free side of bag 12 between the main bag portions into a position generally adjacent the inboard end of the diffuser 14. This latter stage of the tucking causes the lower side of bag 12 to have a skewed edge shown in phantom in FIG. 4 and indicated generally by 126, and the bag 12 then has a somewhat triangular configuration.

The tucking operation then proceeds with the tucking arm 54 in its retracted position, shown by solid line representation in FIG. 4, being clamped to the lower left-hand corner of the bag which is the inboard end of the bag when located in the vehicle. Also, a clamp 128 mounted on base 20 by an upstanding support 130 is then clamped to the bag 12 at the lower vertex of the somewhat triangular bag configuration. FIGS. 1 and 2 illustrate the movement of this clamp 128 between its clamping and unclamping positions. After this clamping, the tucking arms 46 and 54 are moved from their FIG. 4 solid line indicated retracted positions to their phantom line indicated extended positions to tuck the inboard end of the bag 12 between the main bag portions 124. The clamp 28 will slidably release the upper left-hand corner of bag 12 during this stage of the tucking, and the bag will thereafter be generally contained between the brackets 26 supporting the ends of diffuser 14. The piston and cylinder arrangement 104 is then actuated to bring the pincher arms 94 to their inner positions where the main bag portions 124 are positioned adjacent one another. The pinchers 110 are then supplied a differential fluid pressure to unpinch the main bag portions 124. Subsequently, the end tucking arms 44, 46 and 54 are unclamped from the bag 12 in the manner previously described by reference to FIG. 14. These end tucking arms, as well as the side tucking arm 88, are then moved to back their FIG. 4 solid line indicated retracted positions and the tucking operation is then completed with only clamp 128 still clamped to bag 12.

The rolling operation of bag 12 is commenced by moving a rolling assembly 132 from the phantom line storage position shown in FIG. 5 to the solid line indicated use position shown. This rolling assembly, as seen best by reference to FIG. 2, includes two pairs of adjacent vertical guide rods 134. Each pair of these guide rods 134 is spaced approximately the length of diffuser 14 from the other and the bag 12 is located in this spacing with the rolling assembly moved to its use position. The upper ends of guide rods 134 are respectively secured to the lower ends of a pair of brackets 136 which, as best seen in FIG. 4, have upper ends received between pairs of spaced brackets 138 mounted on the mounting plate 24 of the apparatus framework. Pins 140 extend between brackets 138 and pivotally support brackets 136 so that the rolling assembly 132 is supported for movement between the use and storage positions shown in FIG. 5.

The lower ends of guide rods 134, as best seen in FIG. 4, are secured to plates 142 that are interconnected by a horizontal support member 144. Adjacent the right-hand pair of guide rods 134, an elongated guide plate 146 extends between the associated upper bracket 136 and the associated lower plate 142. This guide plate defines an elongated vertical slot 148 as seen in FIG. 5, and the upper and lower ends of this slot define enlarged openings 150 much in the configuration of a thermometer bulb. Each pair of guide rods 134 slidably supports an associated carrier indicated at 152 and best seen in FIGS. 2 and 4. These carriers are thus slidably movable in a vertical direction toward and away from the diffuser 14 when the rolling assembly 132 is positioned in its use position.

Figure 12:
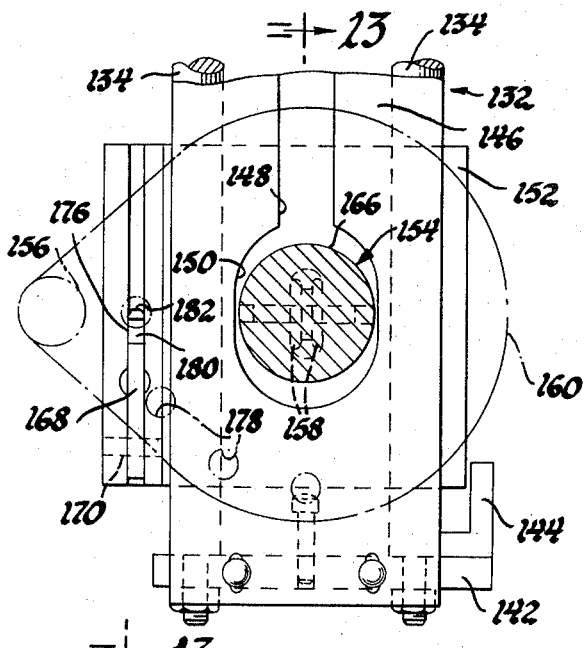
FIG. 12 is a view of the rolling assembly taken generally along line 12—12 of FIG. 4 and shows the manner in which the end of the clamp opposite the one shown in FIGS. 10 and 11 is rotatably supported after the clamp is inserted into its clamping position.
Figure 13:
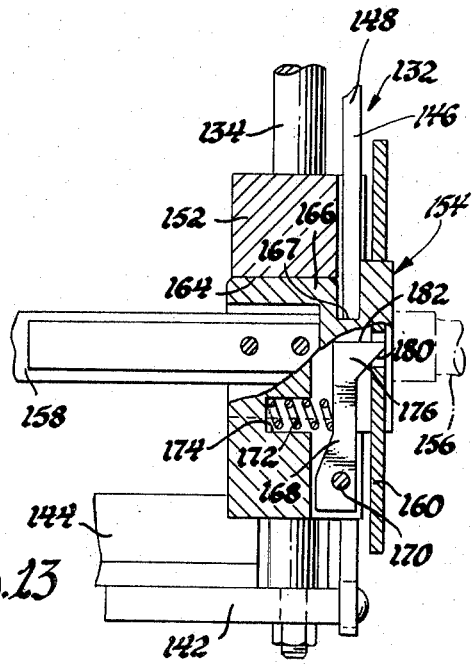
FIG. 13 is a sectional view of the rolling assembly taken along line 13—13 of FIG. 12 and also shows the manner in which the clamp end shown in FIG. 12 is rotatably supported.

As seen in FIG. 4, an elongated clamp 154 has a generally sword-shaped configuration with a handle 156 and a blade portion composed of a pair of tine portions 158 that give this blade portion an elongated bifurcated configuration. Adjacent the clamp handle 156, the clamp 154 includes a plate 160 which, as seen in FIG. 12, has a somewhat rounded triangular configuration with the handle 156 being carried by the vertex of this configuration. This clamp 154 is normally stored on a bracket 162 in the phantom line position shown by FIG. 4 when not being used. When use of clamp 154 is required, the clamp is removed from this bracket and positioned with the tips of its tine portions 158 adjacent the FIG. 4 right-hand carrier 152 pointing toward the left-hand carrier 152. As seen in FIG. 13, this right-hand carrier 152 includes a central aperture 164 that is aligned with the lower opening 150 of slot 148 in guide plate 146 when the carrier 152 is in its lower position as shown. This positioning allows an annular bearing 166 of the clamp 154 to pass through plate 146 and into a bearing aperture 167 in carrier 152. An annular groove 167 of the bearing 166 receives the guide plate 146 at slot 148 during vertical movement of the carrier 152 and thereby axially positions the clamp 154. As can be seen, this bearing 166 secures the tine portions 158 of clamp 154 with respect to the clamp plate 160 so that rotation of handle 156 rotates the tine portions.

As shown also be FIGS. 12 and 13, a pawl 168 is pivoted to the lower end of this carrier 152 by a pin 170. A helical spring 172, FIG. 13, has its left-hand end received within a hole 174 in carrier 152 and the right-hand end of this spring engages the pawl 168 above pin 170 to bias the pawl to the right. A nose 176 of pawl 168 is thus biased into the plane of the clamp plate 160 which includes a number of round apertures 178 arranged about the axis of the clamp tine portions 158 in an annular arrangement as can be seen in FIG. 12. The lower right-hand side of pawl nose 176 has a tapered face 180, as seen in FIG. 13, and the upper side has a flat face 182. Tapered face 180 allows the pawl 168 to ratchet over the apertures 178 in clamp plate 160 when clamp 154 is rotated clockwise about the elongated axis of tine portions 158, as viewed in FIG. 12. However, reverse rotation in the counterclockwise direction is prevented by engagement of the flat pawl face 182 with the clamp plate 160 at the apertures 178.

Figure 10:
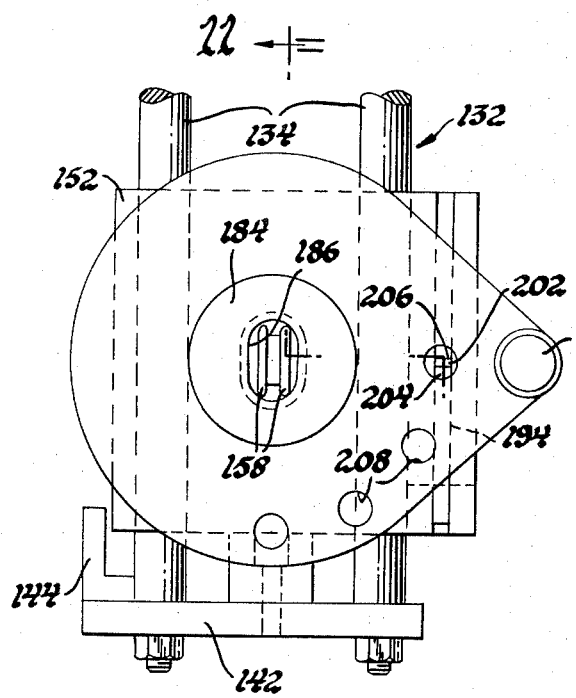
FIG. 10 is a view of the lower end of the rolling assembly taken generally along line 10—10 of FIG. 4 and shows the manner in which the free end of the elongated rolling clamp is rotatably supported after the clamp is inserted into its clamping position.
Figure 11:
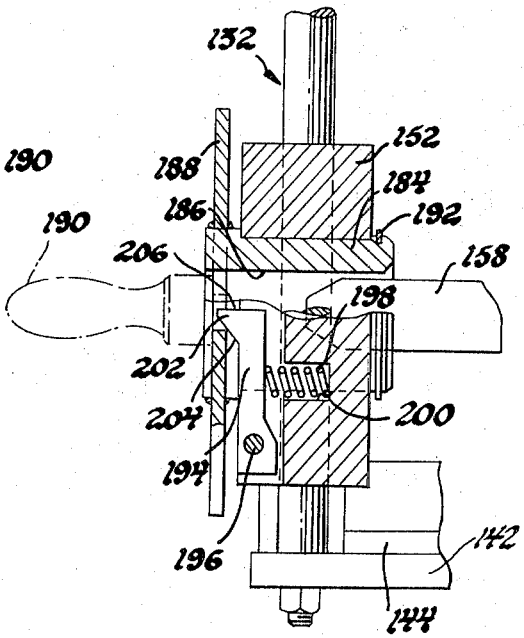
FIG. 11 is a sectional view taken along line 11—11 of FIG. 10 and also shows the manner in which this free end of the clamp is rotatably supported.

As seen in FIG. 4, when the clamp 154 is inserted through the right-hand carrier 152, the tips of the tine portions 158 are received adjacent the left-hand carrier 152. FIGS. 10 and 11 illustrate enlarged views of this and show that this particular carrier 152 rotatably supports an annular bearing 184 with a central oblong aperture 186. The tips of the clamp tine portions 158 are received by this bearing aperture 186 when the clamp 154 is inserted to its FIG. 4 solid line indicated position and are thereby made to rotate with the bearing. The left-hand end of bearing 184, as viewed in FIG. 11, is secured to a plate 188 that carries a handle 190. This plate and handle are similar to handle 156 and plate 160 shown in FIGS. 12 and 13. The FIG. 11 right-hand end of bearing 184 carries a snap ring 192 that prevents axial movement of the bearing with respect to the associated carrier 152 toward the left. A pawl 194 is pivoted to this carrier 152 by a pin 196. The right-hand end of a spring 198, as seen in FIG. 11, is received within a hole 200 in the carrier and the left-hand end thereof engages the pawl 194 to bias the pawl to the left. An upper nose 202 of pawl 194 has a lower tapered face 204 and an upper flat face 206. This nose is normally biased into engagement with the plate 188 which, as seen in FIG. 10, defines apertures 208 arranged in an annular configuration about the central axis of bearing 184. This pawl 194 and plate 188 thus provide a pawl and ratchet arrangement similar to the pawl and ratchet arrangement shown in FIGS. 12 and 13 in order to allow only rotational movement of the clamp in the direction previously specified.

Figure 15:
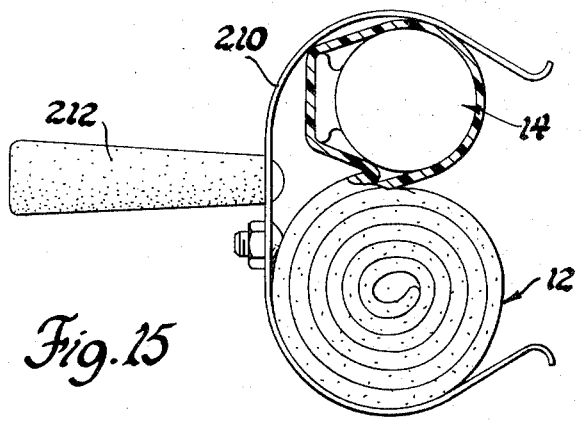
FIG. 15 shows a spring clip which is snapped over the rolled bag and diffuser to allow removal of the bag from the apparatus and installation in a vehicle.

As the clamp 154 is inserted into the position described above, the clamp tine portions 158 are passed on opposite sides of the lower vertex defined by the triangular bag configuration in the manner shown by FIG. 2. The clamp 128 is then actuated to release bag 12 and the rolling operation is started by rotating both handles 156 and 190 so that the clamp 154 rolls the bag 12 about the longitudinal clamp axis and thereby pulls the carriers 152 upwardly toward the pincher arms 94. After the rolling process has proceeded to a small extent, the pincher arms 94 are actuated to move away from each other so that the rolling can then proceed between the pincher arms and up toward diffuser 14 at the upper portion of the apparatus. The tucked roll thus formed by this rolling operation then assumes the configuration shown by FIG. 3 extending alongside diffuser 14 and is secured by a pair of spring clips 210 as shown in FIGS. 3 and 15. These clips have handles 212 that allow the stored bag to be removed from the apparatus 10 and then installed within a vehicle ready for use.

The carriers 152 may alternately be coordinated for simultaneous movment by a pulley and wire arrangement so that only one handle at one of the carriers is necessary to provide the rotation of clamp 154 as the bag is rolled. These carriers 152 may also be connected in other ways for coordinated movement with each other.

After both the tucking and rolling operation have taken place, the clamp 152 is pulled axially to the right, as in FIG. 4, to unclamp the bag. The upper opening 150 of guide plate slot 148 allows this movement of the clamp without interference with the bearing 166 of the clamp. The rolling apparatus 132 is then moved to its FIG. 5 phantom line indicated storage position so that the apparatus is ready for another cycle. Another diffuser received within an unrolled bag is then mounted on the apparatus and the tucking and rolling operation can be then begin again.

It is believed evident from the foregoing description that this invention provides an apparatus for tucking and rolling a vehicle occupant air bag into a stored condition.

What is claimed is:

1. An apparatus for tucking and rolling a vehicle occupant air bag into a stored condition, the apparatus comprising:

a framework including support means for mounting the opposite ends of an elongated diffuser that is inserted into the bag before the tucking and rolling operation;

means for moving the bag between a deflated condition and an expanded condition where the bag extends outwardly from the diffuser with a free side thereof opposite the diffuser, with the ends thereof spaced from each other a greater length than the length of the diffuser, and with a pair of main bag portions extending between the diffuser, the bag ends and the bag free side in spaced relationship to each other;

a pair of tucking arms mounted for movement relative to the framework adjacent the opposite ends of the expanded bag, the tucking arms being movable between retracted positions where the bag is allowed to assume the expanded condition and extended positions where the ends of the bag are tucked between the main bag portions so that the bag is generally located between the ends of the diffuser, and the tucking arms being moved back to the retracted positions after the bag is deflated subsequent to the tucking of the bag ends;

carrier means mounted on the framework for movement toward and away from the diffuser on the side thereof adjacent the free side of the bag;

an elongated clamp mounted on the carrier means so as to be rotatable about the longitudinal axis of the clamp in a generally parallel relationship with respect to the longitudinal axis of the diffuser, the clamp being clamped to a portion of the bag adjacent the free side thereof to commence the rolling operation with the carrier means located in an outer position away from the diffuser; and means for rotating the clamp to roll the bag thereabout as the carried means moves to an inner position adjacent the diffuser and the bag is stored in a tucked and rolled condition alongside the diffuser.

2. An apparatus for tucking and rolling a vehicle occupant air bag into a stored condition, the apparatus comprising:

a framwork including support means for mounting the opposite ends of an elongated diffuser that is inserted into the bag before the tucking and rolling operation;

means for moving the bag between a deflated condition and an expanded condition where the bag extends outwardly from the diffuser with a free side thereof opposite the diffuser, with each of the bag ends extending outwardly past the adjacent end of the diffuser, and with a pair of main bag portions extending between the diffuser, the bag ends and the bag free side in spaced relationship to each other;

a plurality of tucking arms mounted on the framework adjacent the opposite ends of the expanded bag, the tucking arms being movable between retracted positions where the bag is allowed to assume its expanded condition and extended positions where the ends of the bag are tucked between the main bag portions so that the bag is generally located between the ends of the diffuser, and the tucking arms being moved back to the retracted positions after the bag is deflated subsequent to the tucking of the bag ends;

carrier means mounted on the framework for movement toward and away from the diffuser on the side thereof adjacent the free side of the bag, the carrier means including a pair of spaced bearings means that are aligned with a common axis generally parallel to the longitudinal axis of the diffuser;

an elongated clamp adapted to extend between the bearings means so as to be rotatably supported by the carrier means, the clamp being clamped to a portion of the bag adjacent the free side thereof to commence the rolling operation with the carrier means located in an outer position away from the diffuser;

means for rotating the clamp to roll the bag thereabout and pull the carrier means toward the diffuser in a manner that stores the bag in a tucked and rolled condition alongside the diffuser; and means for preventing unrolling bag rotation of the clamp during the rolling operation.

3. An apparatus for tucking and rolling a vehicle occupant air bag into a stored condition, the bag being for use in restraining both the center and outboard passengers of a vehicle front seat, the apparatus comprising:

a framework including a support means for mounting the opposite ends of an elongated diffuser that is inserted into the bag before the tucking and rolling operation and is adapted to be mounted on a vehicle extending transversely thereof forward of the center and outboard front seat passengers;

means for moving the bag between a deflated condition and an expanded condition where the bag extends outwardly with a free side thereof opposite the diffuser and with the ends thereof respectively extending past the adjacent ends of the diffuser, the inboard end of the bag extending slightly further past the inboard end of the diffuser than the outboard end extends past the outboard end of the diffuser, and a pair of main bag portions extending between the diffuser, the bag ends and the free bag side in spaced relationship to each other when the bag is expanded;

a plurality of end tucking arms mounted on the framework adjacent the opposite ends of the bag and a side tucking arm mounted on the framework adjacent the outboard portion of the free side of the bag, the tucking arms being movable between retracted positions where the bag is allowed to assume the expanded condition and extended positions where the arms tuck the bag ends and free side between the main bag portions, the end tucking arms tucking the ends of the bag so that the bag is generally located between the ends of the diffuser, the side tucking arm tucking the outboard portion of the free side of the bag adjacent the inboard end of the diffuser so that the bag has a somewhat triangular configuration, and the tucking arms being moved back to the retracted positions after the bag is deflated subsequent to the tucking of the bag ends and free side;

carrier means mounted on the framework for movement toward and away from the diffuser on the side thereof adjacent the free side of the bag, the carrier means including a pair of spaced bearings means that are aligned with a common axis generally parallel to the longitudinal axis of the diffuser;

an elongated clamp adapted to extend between the bearings means so as to be rotatably supported by the carrier means, the clamp being clamped to the bag adjacent the inboard end of the diffuser at the vertex of the triangular bag configuration adjacent the free side of the bag, and the carrier means being located in an outer position away from the diffuser so as to commence the rolling operation with the bag clamped by the clamp; and means for rotating the clamp to roll the bag thereabout and pull the carrier means toward the diffuser in a manner that stores the bag in a tucked and rolled condition alongside the diffuser.

4. An apparatus for tucking and rolling a vehicle occupant air bag into a stored condition, the bag being for use in restraining both the center and outboard passengers of a vehicle front seat, the apparatus comprising:

a framework for mounting the opposite ends of an elongated diffuser that is inserted into the bag before the tucking and rolling operation and is adapted to be mounted on a vehicle extending transversely thereof forward of the center and outboard front seat passengers, the bag hanging downwardly from the diffuser when mounted on the framework of the apparatus;

a plurality of end tucking arms mounted on the framework adjacent the inboard and outboard ends of the hanging bag and a side tucking arm mounted on the framework adjacent the outboard end of the lower side of the hanging bag, the end tucking arms including clamping means for selectively securing the adjacent ends of the bags, the arms being positionable in retracted positions where the inboard and outboard bag ends extend past the adjacent ends of the diffuser and in extended positions to perform the tucking, and a pair of main bag portions extending between the diffuser, the bag ends and the lower bag side with the tucking arms in the retracted positions;

pincher arms mounted on the framework for movement between inner positions engaging the main bag portions and outer positions in spaced relationship to each other, the pincher arms having means for selectively pinching the main bag portions while located in the inner positions so that these arms position the main bag portions in spaced relationship to each other upon movement to the outer positions with the main bag portions pinched thereto, the end tucking arms being moved to the extended positions to tuck the ends of the bag between the spaced main bag portions so that the bag is generally located between the ends of the diffuser, the side tucking arm being moved to the extended position to tuck the outboard portion of the bag upwardly adjacent the inboard end of the diffuser so that the bag defines a somewhat triangular configuration, and the pincher arms being movable back to the inner positions and the tucking arms being movable back to the retracted positions prior to completion of the rolling operation;

carrier means mounted on the framework below the diffuser for vertical movement between an upper position adjacent the diffuser and a lower position generally adjacent the lower side of the bag, the carrier means including a pair of spaced bearings means that are aligned with a common axis generally parallel to the longitudinal axis of the diffuser;

an elongated clamp that is inserted axially through the pair of spaced bearings means so as to be rotatably supported by the carrier means and to also clamp the bag adjacent the inboard end of the diffuser at the lower vertex of the triangular bag configuration, and the carrier means being located at the lower position to commence the rolling operation with the bag clamped by the clamp; and means for rotating the clamp to roll the bag thereabout and pull the carrier means to the upper position adjacent the diffuser in a manner that stores the bag in a tucked and rolled condition alongside the diffuser, the clamp being pulled axially from the stored bag after the rolling operation so that the diffuser and bag may be removed from the framework for installation in a vehicle.

5. An apparatus for tucking and rolling a vehicle occupant air bag into a stored condition, the bag being for use in restraining both the center and outboard passengers of a vehicle front seat, the apparatus comprising:

a framework for horizontally mounting the opposite ends of an elongated diffuser that is inserted into the bag before the tucking and rolling operation and is adapted to be mounted on a vehicle extending transversely thereof forward of the center and outboard front seat passengers, the bag hanging downwardly from the diffuser after mounting thereof on the framework;

a plurality of end tucking arms mounted on the framework adjacent the inboard and outboard ends of the hanging bag and a side tucking arm adjacent the outboard end of the lower side of the hanging bag, the end tucking arms including clamping means for selectively securing the adjacent ends of the bag, the arms being positionable in retracted positions where the inboard and outboard bag ends extend past the adjacent ends of the diffuser and in extended positions to perform the tucking, and a pair of main bag portions extending between the diffuser, the bag ends and the lower bag side when the tucking arms are in the retracted positions;

two pairs of aligned pincher arms mounted on the framework for movement between inner positions engaging the main bag portions and outer positions where the pincher arms of each pair are in spaced relationship to each other, the pincher arms having means for selectively pinching the main bag portions while located in the inner positions so as to subsequently position the main bag portions in spaced relationship to each other upon movement of the pincher arms to the outer positions, the end tucking arms being moved to the extended positions to tuck the ends of the bag between the spaced main bag portions so that the bag is generally located between the ends of the diffuser, the side tucking arm being moved to the extended position to tuck the outboard portion of the bag upwardly adjacent the inboard end of the diffuser so that the bag defines a somewhat triangular configuration, and the pincher arms and tucking arms being moved back to the retracted and inner positions, respectively, prior to completion of the rolling operation;

carrier means mounted on the framework below the diffuser for vertical movement between an upper position adjacent the diffuser and a lower position generally adjacent the lower side of the bag, the carrier means including a pair of spaced bearings means that are aligned with a common axis generally parallel to the longitudinal axis of the diffuser;

an elongated clamp of a bifurcated configuration that is inserted through the pair of spaced bearings means so as to be rotatably supported thereby and to clamp about the bag adjacent the inboard end of the diffuser at the lower vertex of the triangular bag configuration, and the carrier means being located at the lower position to commence the rolling operation with the bag clamped by the rotatable clamp;

manually operable means for rotating the clamp to roll the bag thereabout the pull the carrier means to the upper position adjacent the diffuser in a manner that stores the bag in a tucked and rolled condition alongside the diffuser, the clamp being pulled axially out of the bearings means to unclamp the bag after the rolling operation so that the diffuser and bag may be removed from the framework for installation in a vehicle; and pawl and ratchet means for preventing reverse rotation of the clamp during the rolling operation.

* * * * *